United States Patent Office 3,518,185
Patented June 30, 1970

3,518,185
DRILLING MUD ADDITIVES
Philip Roemer, Bradley, and Russell Downhour, Jr., Kankakee, Ill., assignors to General Foods Corporation, White Plains, N.Y., a corporation of Delaware
No Drawing. Filed Feb. 7, 1966, Ser. No. 525,320
Int. Cl. C10m *3/22;* C13l *1/08, 1/00*
U.S. Cl. 252—8.5
2 Claims

ABSTRACT OF THE DISCLOSURE

A drilling mud additive has been prepared from farinaceous material which contains relatively high gluten and fat contents and which has between 30 to 40% room temperature, soluble water solids on a dry basis. The product is particularly useful in rotary method of boring oil and gas wells as additive to the drilling mud to inhibit water loss. The key to achieving the desired product is pretreatment of the raw flour and control of moisture.

---

This invention relates to drilling mud additives and the production thereof, specifically additives to prepare drilling fluids of use in the rotary method of boring oil and gas wells.

Heretofore the use of a pregelatinized starch for the purpose of providing a low water loss at a suitable drilling viscosity has been suggested in the prior art, typically, U.S. Pat. No. 2,417,307, issued Mar. 11, 1947, to Larsen. Larsen discloses various means whereby starch, such as tapioca and corn starch, may be pregelatinized for said purpose, included among which means is the autoclaving and coincident gelatinization described in Anderson U.S. Pat. No. 679,289. While such means, as is set forth in the Anderson and Larsen teachings, does precondition starch or starch-containing grain sources and by-products with heat and moisture by treating such materials in a chamber wherein the starch is gelatinized, a need still exists for an economical drilling mud additive of uniform and predictable good water loss characteristics.

A process has now been found whereby with specific processing conditions and the use of specific raw materials, the product so produced is suitable as a water binder in oil well drilling fluids and indeed imparts eminent and uniform low water loss characteristics at drilling mud viscosities.

The present invention is preferably carried out by employing inexpensive sources of high starch material, for example, a fine granulated fraction of farinaceous materials derived from cereals such as corn endosperm, but is not to be restricted in any such application to the treatment of such starch materials but rather can be employed on any amylaceous substance which through the process of partial degradation will yield a high level of water soluble solids, to-wit, those soluble solids which are recoverable as filtrates when the material is blended with agitation in an excess of water at room temperature to provide a filterable suspension and filtered.

The process of the present invention involves finely dividing the starch-containing material, e.g., corn endosperm, to the extent that at least 80% will pass a USS No. 70 screen or finer and uniformly prewetting and steaming such finely divided material to a moisture content ranging between 18–24% (wet basis), preferably 20%. During this wetting and steaming, the finely divided farinaceous material of the stated moisture content is subjected to heat just sufficient to elevate the material to a temperature of 160°–200° F. at the point of introduction to a high temperature, high pressure, high shear continuous extrusion zone, the mixture being heterogenous just prior to such introduction. Upon introduction to said zone the mixture is then further heated, compressed and subjected to high shear forces to and thereby converted to a coherent plastic mass due to development of frictional forces between the farinaceous particles and mechanical rotatory elements of the extrusion cooker, which cooker is preferably of the type described in U.S. Pat. No. 3,117,006, issued Jan. 7, 1964, to Joseph Wenger, entitled "Method of Increasing Palatability and Digestibility of a Cereal Product." By such operation, the temperature of the mass is elevated to a point whereat the cut extrudate undergoes a moisture content reduction incident to extrusion of at least 10% and not more than 50% due to flash vaporization as the material is caused to issue from the extruder; the extrudate is in a form which initially expands upon emergence from the confined area of high pressure within the extrusion zone and then collapses to a cross-sectional area which is still in excess of extrusion orifice cross-sectional area. By this extrusion operation and the mechanical working incident thereto, gelatinization and rupture of the starch granules proceeds to the extent that a controlled amount of soluble starch degradation products are produced, generally, 30–40% room temperature water soluble solids on a dry solids basis.

The particle size distribution of the farinaceous material as it is fed to the extrusion cooker is important since it is essential that a controlled amount of frictional heat be generated by the working surfaces of the extrusion cooker operating at a comparatively reduced moisture level to achieve a maximal amount of starch degradation and consequent increase in the level of soluble solids. While the heat treatment which the mass undergoes during extrusion cooking may be a function solely of the frictional heat existing between kneading mechanical elements of the extrusion cooker or of such heat in combination with external heat applied to the kneaded mass as it is treated, it is a further feature of this invention that the finely divided comparatively low moisture material be prewetted and heated to an elevated temperature in the aforestated range of 160°–200° F. in order to achieve a uniform and maximal effect in starch degradation to produce the aforestated level of soluble solids. In this way the mass issuing from the die opening at the terminal portion of the extrusion chamber will be such that the starch content thereof when viewed microscopically will have lost substantially all birefringence and the starch cells will have been substantially ruptured, that is, at least 90%, and indeed, the preferred optimal conditions of the present invention result in a product wherein only a number of starch cells too infrequent to count and statistically measure exhibit birefringence, so that for all practical purposes all the starch granules will have undergone a complete loss of birefringence and a large number thereof will have been ruptured.

EXAMPLE I

Ground brewer's corn grits having a particle size whereat 90% passes a USS No. 70 screen was fed to a conditioning vessel in the apparatus shown and described in U.S. Pat. No. 3,117,006 and wherein the ground corn flour was transmitted from hopper 10 to the tube 14 in chamber 12 thereof, and wherein the flour was wetted and steamed to a moisture content of 20% through rotation of the screw flights within the cylindrical chamber defined by tube 14 in said patent. This apparatus promotes uniform mixing of the farinaceous material and steam and water introduced thereto. The corn flour was elevated in approximately five seconds to a temperature of 180° F. as measured by direct reading thermometer inserted into the throat of the discharge from the treating chamber. During this step of the process the corn flour was soft due to the uptake of moisture added in the form of steam and water; in this condition the wetted corn flour will mold to the hand when it is subjected to normal hand pressure and will retain this shape but will break apart readily when subjected to a deformation force attempting to break up the shaped piece. At this point the starch component of the corn flour is not gelatinized materially.

The wetted corn mixture was then fed into the second tube of the extrusion cooking apparatus set forth in the cited Wenger patent and processed under conditions whereby the free space between the surface of the auger flights and the inner surface of the cooking chamber was substantially occupied by the material being advanced therein against the back pressure of the material passing through the extruding head so that the corn mixture in the cooking chamber was subjected to a combination of frictional heat and mechanical treatment by the work applied thereto as well as the heat of the steam fed to the jacket for the cooking chamber. The mass was then delivered to the outer chamber of the cooker where it was subjected to a high pressure and temperature build-up due to the narrowing of the free space between the tapering conical surface of the jacket and the complementary flights rotating therewithin as well as the restriction existing in the die plate through which the mass was extruded in the form of "ropes." Dwell time in the extrusion cooker was approximately 23 seconds.

By reason of the pressure and temperature build-up as the wetted corn mixture passed through the extrusion cooker, part of the moisture of the extrudate was caused to flash off as steam as extrudate issued through the die plate, thereby causing the extrudate to expand to three to four times the volume of the die openings, whereafter the extrudate collapsed in a period of one to two seconds to a volume of one and a half to two times the volume of the die opening. The extrudate was thermoplastic, had a temperature of about 200° F. and if allowed to stand at room temperature rapidly cooled in about 2 to 3 minutes to a tough, horny, glassy form. The cooled extrudate appeared to have tiny openings at its surface, although at certain points along its length it had blisters or cavities. The interior of the cooled extrudate also had the same porous structure. The moisture content of the extrudate issuing from the chamber was between 15 and 17% moisture.

The hot plastic extrudate was then fed into a corn chopper wherein it was cut into lengths and deposited in a dryer having air circulating at a temperature of 300° F. to bring these lengths down to a moisture content of less than 8%. The dry product recovered was fed to a second chopper adapted to produce material which passed a screen having ¼" openings therein and was then ground and hammer milled to usual flour fineness.

The final product has a density of approximately 600 grams per dry quart. This same product when ground to varying degrees of granulation below the aforesaid particle size still exhibits a product density in a range of 550 to 650 grams per dry quart. When the floury product was blended with an excess of water at room temperature, a portion thereof dissolved and was filtered off. The filtrate contained soluble solids at a level equivalent to 35% of the total weight of product admixed with the water. This farinaceous material has performance characteristics which compare favorably with generally accepted standards of good water loss preventatives as measured by A. P. I. procedures for testing drilling fluids and particularly the filtration tests thereof. Following the procedures set forth for such filtration measurements and using a mud containing three pounds of pregelatinized corn starch for a barrel of mud containing the equivalent of 20 lbs. bentonite clay per barrel and 126 lbs. salt paper barrel, the product had a water loss of 10.0 cc. initially and after the mud was held 24 hours had a water loss of only 12.1 cc. and after 48 hours only 12.8 cc.

The drilling mud additive to the present invention is useful in a variety of drilling conditions and displays similar water loss characteristics in salt, gypsum and fresh water muds.

While the invention has been described by reference to specific examples, it is understood that the tenets thereof can be applied to a variety of starch-containing materials, including cereal and tuber-derived flours such as sorghum and tapioca.

What is claimed is:

1. A water base drilling mud containing an expanded amylaceous material in an amount sufficient to reduce the water loss of the drilling mud, said amylaceous material having between 30–40% of room temperature water soluble solids on a dry solids basis, said expanded amylaceous material being derived from a starch-containing material by grinding said material to a particle size whereat at least 80% passes a No. 70 USS screen wetting, said ground material to a moisture content of 18–24% by weight of the wet material, heating said ground material to a temperature of 160°–200° F., then subjecting said prewetted and preheated material to shearing stresses, elevated temperatures and elevated pressures within a confined zone of an extruder to cause the starch granules of said material to undergo a substantially complete loss of birefringence and to be degraded to water soluble solids, the temperature of said material being maintained at a minimum of 160° F. in the extruder; the temperature of said material having been increased to at least 200° F. prior to discharge through an extrusion orifice of an unconfined zone of lower pressure causing 10 to 50% of the moisture content of said material to rapidly flash off as steam thus expanding the amylaceous content of said material and causing an increase in water soluble solids to the desired range; drying and grinding the expanded material.

2. The drilling mud of claim 1 wherein said amylaceous material is corn.

References Cited

UNITED STATES PATENTS

| 2,417,307 | 3/1947 | Larson | 252—8.5 |
| 3,117,006 | 1/1964 | Wenger | 99—80 |
| 3,137,592 | 6/1964 | Protzman et al. | 127—71 |
| 3,294,681 | 12/1966 | Stearns et al. | 252—8.5 |

HERBERT B. GUYNN, Primary Examiner

U.S. Cl. X.R.

127—32, 71